W. A. BIRKHOLZ.
ATTACHMENT FOR MANURE SPREADERS.
APPLICATION FILED MAR. 20, 1915.

1,160,688.

Patented Nov. 16, 1915.
2 SHEETS—SHEET 1.

WITNESSES:
John F. Schrott
Charles J. Diller

INVENTOR
William A. Birkholz

BY
ATTORNEY.

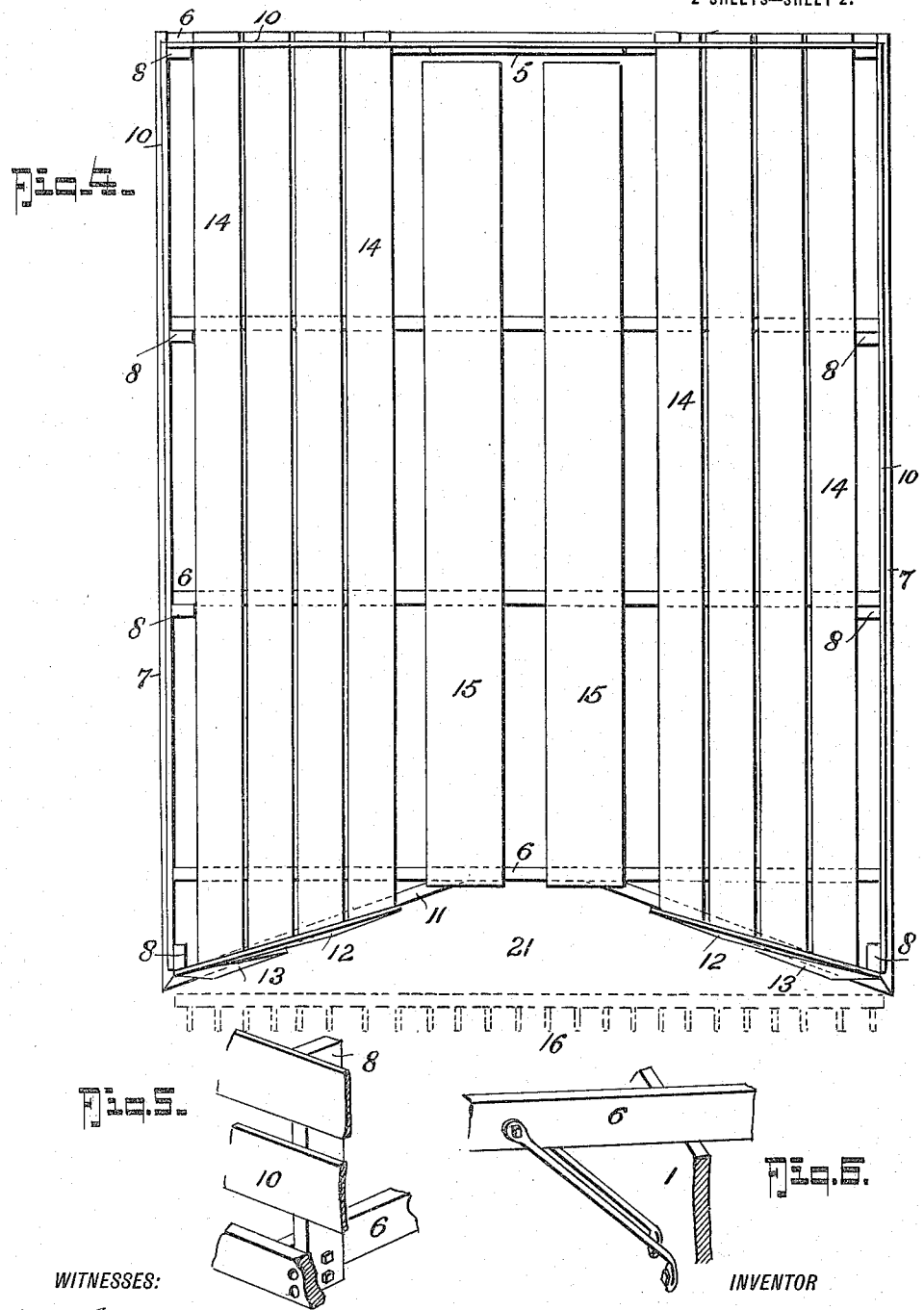

UNITED STATES PATENT OFFICE.

WILLIAM A. BIRKHOLZ, OF HEBRON, NEBRASKA.

ATTACHMENT FOR MANURE-SPREADERS.

1,160,688.                    Specification of Letters Patent.       Patented Nov. 16, 1915.

Application filed March 20, 1915. Serial No. 15,938.

*To all whom it may concern:*

Be it known that I, WILLIAM A. BIRKHOLZ, residing at Hebron, in the county of Thayer and State of Nebraska, have invented certain new and useful Improvements in Attachments for Manure - Spreaders, of which the following is a specification.

My invention is a rack attachment designed to be secured to the body of a manure spreader of the endless apron type for the purpose of spreading dry manure and straw, the rack being designed to enable the operator to haul several times the bulk of material than can be hauled with the ordinary spreader *per se.*

In its generic nature, the invention comprises a rack having bottom beams designed to rest crosswise on the body or bed of the spreader and to be suitably fastened to the same, the bottom beams being extended beyond the sides of the spreader body and support fixed flooring boards at the side extensions, there being a fence provided on the front and sides of a uniform height, and back fence sections extending from the sides downwardly and terminating at the bed or body of the spreader, the back fence sections being held in vertical planes that converge forwardly and inwardly toward the body to provide rear portions that project back of the front plane of the beater tractor wheels of the spreader; the cross beams also supporting removable floor boards over the body of the spreader to hold up the load until the portion of the load in the spreader body *per se*, shall have been discharged.

Figure 1:
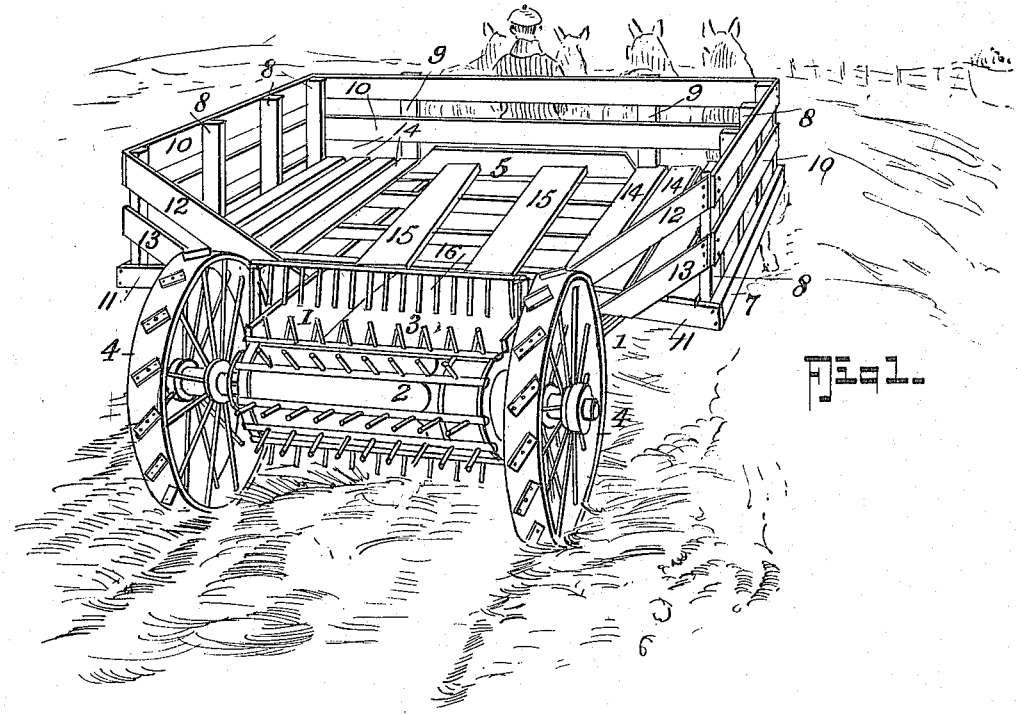
Figure 2:
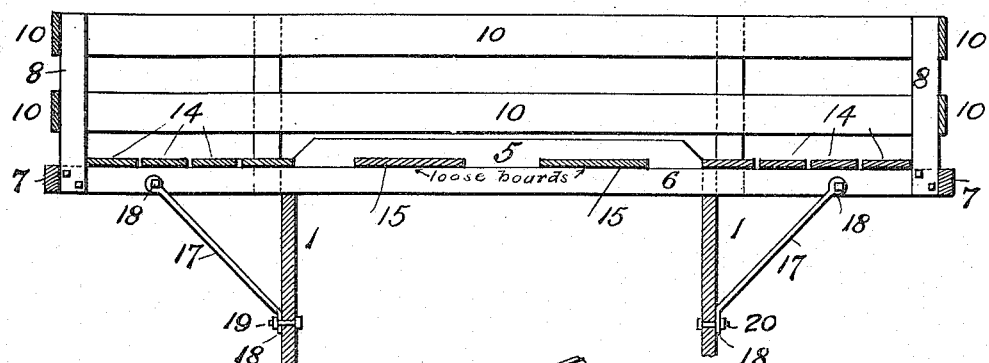
Figure 3:
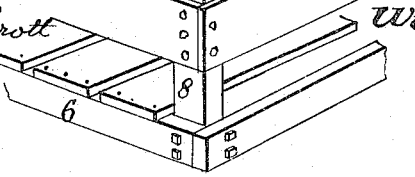

More subordinately, the invention includes those novel details of construction, combination and arrangement of parts, all of which will be first fully described, then be specifically pointed out in the appended claims, reference being had to the accompanying drawings, in which:

Figure 1 is a perspective view showing the invention in use, looking from the rear of the vehicle. Fig. 2 is a vertical cross section of the invention, the sides of the spreader body being indicated to show the manner of attaching the rack to the body. Fig. 3 is an enlarged detail view of one of the corner constructions. Fig. 4 is a top plan view of the invention, *per se*, the beater "rake" being indicated in dotted lines. Fig. 5 is a detail perspective view showing the manner of securing the uprights to the cross beam and the side longitudinal beams to the same. Fig. 6 is a detail perspective view showing the manner of securing the cross beams to the body of the spreader.

In the drawings, in which like letters and numerals of reference indicate like parts in all of the figures, 1 designates the body of the spreader, at the rear of which the usual tractor wheels 4 are located, and between which wheels is located the beater 2 and the "rake" or comb 16, the latter being located above the plane of the body.

3 designates the endless apron for conveying the contents of the body to the beater. The construction of the spreader, *per se*, may be as shown, as the spreader, *per se*, forms no part of the present invention.

The bottom, which forms the subject-matter of the present invention, comprises a set of cross beams 6 (preferably four in number) that are adapted to be suitably secured to the body of the spreader by braces 17 having eyes 18 to receive the bolts 19—20. The cross beams 6 project beyond the sides of the spreader to form side extension and their ends are united by longitudinal beams 7.

8 designates a series of side uprights extending from the beams 6, and 9 designates corresponding front uprights, the uprights 8 and 9 serving to support the fence boards 10, which extend around on the two sides and the front of the attachment.

5 is the front board of the spreader body which is adapted to project up adjacent to the front fence.

11 designates beam members, the outer ends of which are secured to the rear ends of the longitudinal beams 7, (the rear ends of the beams 7 project rearwardly beyond the rear cross beam 6) and the beams 11 converge inwardly and forwardly and are secured to the rear cross beams 6 adjacent to the sides of the body of the spreader.

12—13 are rear fence boards that extend downwardly and inwardly and forwardly from the rear corner posts 8, the rear construction of the attachment being such as to leave a triangular space 21 in front of the rake or comb 16 through which the contents of the rack can be forked onto the endless belt 3 adjacent to the beater, by the attendant.

14 designates the permanent floor boards which are secured to the beams 6 and 11 and extend longitudinally of the vehicle, the boards 14 forming the bottom of the lateral extensions beyond the body of the spreader.

15 designates removable floor boards which may be removed at times, when desired.

In practice, the manure is loaded into the spreader to fill the body 1 (it being understood that the boards 15 are at this time removed) after which the boards 15 may be replaced and the rack attachment completely filled with manure to carry as much as it will hold. By the construction illustrated, I have found that a load of about five times the usual amount can be conveyed than when my attachment is not employed.

From the foregoing description, taken in connection with the accompanying drawings, it is thought the complete construction, operation and advantages of my invention will be readily understood by those skilled in the art to which it appertains.

What I claim is:

1. A rack attachment for spreaders comprising transverse beams adapted to be held over the body of a manure spreader and extended to each side of the same, longitudinal floor boards secured to the beams where they extend beyond the spreader body, a front fence and side fences supported over said beams, said front fence being substantially parallel to said beams, and said side fences extending at right angles thereto, longitudinal beams extending across the ends of the transverse beams and projecting rearwardly beyond the rearmost transverse beam, diagonal beams connecting the rear ends of said longitudinal beams with the rear cross beam adjacent to the spreader body, fence boards extending from the rear ends of the side fences to said diagonal beams to form rear fence portions for the side extensions, and means for securing the aforesaid structure on the body of a manure spreader.

2. A rack attachment for spreaders comprising transverse beams adapted to be held over the body of a manure spreader and extended to each side of the same, longitudinal floor boards secured to the beams where they extend beyond the spreader body, removable floor boards held on the beams over the spreader body, a front fence and side fences supported over said beams, said front fence being substantially parallel to said beams, and said side fences extending at right angles thereto, longitudinal beams extending across the ends of the transverse beams and projecting rearwardly beyond the rearmost transverse beam, diagonal beams connecting the rear ends of said longitudinal beams with the rear cross beam adjacent to the spreader body, fence boards extending from the rear ends of the side fences to said diagonal beams to form rear fence portions for the side extensions, and means for securing the aforesaid structure on the body of a manure spreader.

3. In combination with a manure spreader of the wheeled vehicle endless apron type, said spreader including a beater at the rear to which the endless apron is adapted to convey the material, and a body of which the endless apron forms the bottom; of a rack attachment comprising a bottom structure held over the body of the spreader and projecting beyond each side of the same to form side extensions, a front transverse fence, side longitudinal fences, rear fence sections for the extensions, said rear fence sections lying in planes converging from the rear ends of the side fences inwardly and forwardly to leave a discharge space at the rear of the rack attachment between it and the beater comb to expose a portion of the endless apron, substantially as shown and described.

4. In combination with a manure spreader of the wheeled vehicle endless apron type, said spreader including a beater at the rear, to which the endless apron is adapted to convey the material, and a body of which the endless apron forms the bottom; of a rack attachment comprising a bottom structure held over the body of the spreader and projecting beyond each side of the same to form side extensions, a front transverse fence, side longitudinal fences, rear fence sections for the extensions, said rear fence sections lying in planes converging from the rear ends of the side fences inwardly and forwardly to leave a discharge space at the rear of the rack attachment between it and the beater comb to expose a portion of the endless apron, said bottom structure comprising transverse beams that project laterally beyond the body of the spreader, a permanent flooring on the projecting ends of said beams, the middle portion of said floor structure including removable floor boards.

WILLIAM A. BIRKHOLZ.

Witnesses:
J. P. BALDWIN,
BESS A. RICHARDS.